United States Patent [19]

Nelsen et al.

[11] 4,419,471

[45] * Dec. 6, 1983

[54] CORE-SHELL POLYMERS

[75] Inventors: Suzanne Nelsen, Bergenfield, N.J.; Yehuda Ozari, Louisville, Ky.; Dru Alwani, Wayne, N.J.; Edward Wotier, Chattanooga, Tenn.

[73] Assignee: GAF Corporation, New York, N.Y.

[*] Notice: The portion of the term of this patent subsequent to Apr. 28, 1998 has been disclaimed.

[21] Appl. No.: 429,593

[22] Filed: Sep. 30, 1982

Related U.S. Application Data

[63] Continuation of Ser. No. 299,464, Sep. 4, 1981, abandoned, which is a continuation of Ser. No. 115,649, Jan. 28, 1980, abandoned.

[51] Int. Cl.$^3$ .......................... C08K 5/34; C08K 5/13
[52] U.S. Cl. .................... 524/100; 524/291; 524/333; 524/343; 525/902
[58] Field of Search .............. 525/295, 300, 902; 524/333, 291, 343, 100

[56] References Cited

U.S. PATENT DOCUMENTS

| | | | |
|---|---|---|---|
| 2,962,533 | 11/1960 | Hardy et al. | 560/45.95 F |
| 3,446,873 | 5/1969 | Saito et al. | 260/29.7 UP |
| 4,178,303 | 12/1979 | Lorenz | 525/300 |
| 4,264,678 | 4/1981 | Nelsen et al. | 525/902 |

OTHER PUBLICATIONS

Meyer et al., "Emulsion Rubbers Copolymerized with Monomeric Antioxidants", *Rubber Chemistry and Technology*, vol. 46, No. 1, pp. 106–114, Mar. 1973.

*Primary Examiner*—Veronica P. Hoke
*Attorney, Agent, or Firm*—Joshua J. Ward; J. Gary Mohr; Marilyn J. Mauel

[57] ABSTRACT

Disclosed are improved styrene-butadiene (SBR) core-alkyl acrylate/methacrylate shell-polymer compositions and an improved process for applying patterns to textiles by screen printing employing these polymer compositions as binders. The process for preparing the improved polymers is also set forth. The core comprises an SBR copolymer which contains an antioxidant and is at least partially encased by an integral shell of a copolymer of an alkyl acrylate or methacrylate which is formed by copolymerization with an ultraviolet light stabilizer. When used as binders for screen printing, these compositions produce textiles which exhibit a desirable combination of crock fastness, cyclic aging and hand properties.

6 Claims, No Drawings

CORE-SHELL POLYMERS

This is a continuation of application Ser. No. 299,464 filed Sept. 4, 1981, now abandoned, which in turn was a continuation of Ser. No. 115,649 filed Jan. 28, 1980 now abandoned.

BACKGROUND OF THE INVENTION

The present invention relates to improved core-shell polymers of the type disclosed in concurrently filed U.S. patent application, Ser. No. 115,824, now abandoned entitled "CORE-SHELL POLYMERS AND PROCESS"; and more particularly, the invention relates to core-shell polymers of this type which have superior against ultraviolet light.

In the above-identified U.S. application, there is disclosed a new organic high polymer composition and a process for preparing it. The compositions disclosed therein comprise discrete particles having cores of one polymer completely covered with shells of a different polymer. The shell will preferably be a methyl methacrylate, ethyl methacrylate, butyl methacrylate, or mixed alkyl methacrylate polymer. The core will preferably be styrene-butadiene (SBR) copolymer. By properly selecting the shell monomer, core particle size and reaction conditions to provide a core-shell number of greater than 10, it is possible to concentrate the acrylate polymer near the shell and leave the center of the core free from the shell polymer. These polymers have been suggested for use as screen print binders and those having styrene-butadiene copolymer cores and polyalkyl acrylate/methacrylate shells have been specifically found usable for this purpose because they exhibit better cyclic aging and redispersion properties than the styrene-butadiene copolymer by itself and are less expensive than the polyalkyl acrylate/methacrylate alone.

Screen printing is a process for applying patterns to textile materials. According to this procedure, a rotary drum having a screen printing mask similar to a silk screening mask, is brought into contact with a fabric and has a composition comprising an aqueous thickened dispersion of pigment and binder applied to the outside of the mask. The composition is applied in a predetermined pattern by virtue of the printing of the mask, and the patterned fabric is then heated to fix the design on the fabric.

Prior to the invention described in the above-identified U.S. patent application, print paste binders containing SBR latex were employed to a limited extent. It was found that these binders exhibited a good hand but had poor water redispersibility, thermal stability and stability to ultraviolet light. This led to processing difficulties, poor crock fastness, and poor cyclic aging. Polymerization of acrylic monomers on the surface of the SBR particles according to the disclosure of the above-identified patent application was found to improve water redispersibility and cyclic aging but was found to decrease the hand of the final fabric products. Moreover, the increase in heat and ultraviolet light stability, expressed in terms of cyclic aging, was not always sufficient for all applications.

According to the disclosure of copending U.S. patent application Ser. No. 016,133 filed Mar. 1, 1979, now abandoned, there are disclosed SBR's with improved heat stability and a process for preparing them. It is disclosed therein that incorporating a suitable antioxidant into the monomer mixture prior to polymerization yields an SBR polymer with improved heat stability.

It is also known that some improvement in stability to ultraviolet light can be obtained for polyalkyl acrylate/methacrylate polymers by incorporating a copolymerizable ultraviolet light stabilizer in the monomer mixture prior to polymerization. The inclusion of these stabilizers is not, however, known in core-shell polymers having SBR cores, and there is no indication in the prior art that improved ultraviolet light stability could be obtained when used in particular core-shell configurations, or that other core-shell polymer properties could be improved through their use.

While screen print binder compositions comprising core-shell polymers of the type described in above-identified application, Ser. No. 115,824, now abandoned have a desirable balance of cyclic aging, redispersibility and cost as compared to previously known binders, experience has shown that most of the compositions disclosed therein cause the textile material to which they are applied to become unduly stiff.

There remains a need for improved SBR core-polyalkyl acrylate/methacrylate shell polymers, especially for use as screen print binders which leave the printed fabric soft in the hand, as well as provide good cyclic aging.

SUMMARY OF THE INVENTION

Accordingly, it is object of the present invention to provide improved core-shell polymer compositions particularly suited for use as screen print binders.

It is another object of the present invention to provide improved SBR core-alkyl acrylate/methacrylate shell polymer compositions having improved stability to ultraviolet light.

It is yet another object of the present invention to provide improved SBR core-alkyl acrylate/methacrylate polymer shell screen print binder compositions having improved stability to ultraviolet light which are capable of improving the hand of the printed textiles.

It is a more specific object of the present invention to provide an improved screen print binder composition which combines the necessary properties of crock fastness and cyclic aging with improved softness and feel in the hand.

It is a still more specific object of the present invention to provide an improved screen printing process which will produce printed textiles having good crock fastness, cyclic aging, and softness in the hand.

These and other objects are accomplished according to the present invention which provides a new core-shell polymer composition, a process for preparing the composition, and a screen printing process employing it. The composition comprises: (a) discrete cores of styrene-butadiene copolymer comprising an amount of an antioxidant intimately mixed therein, the amount being effective to improve the stability of the copolymer to oxidation; and (b) shells of a copolymer formed from at least one monomer selected from the group consisting of alkyl methacrylates and alkyl acrylates, and an ultraviolet light stabilizer having a copolymerizable alkyl or vinyl group, said shells at least partially covering the cores.

The process for making the instant compositions broadly comprises: (a) providing an emulsion comprising discrete particles of the styrene-butadiene copolymer in an aqueous vehicle, the copolymer comprising an amount of an antioxidant intimately mixed therein;

(b) adding a monomer mixture comprising at least one monomer selected from the group consisting of alkyl methacrylates and alkyl acrylates and from 0.01 to 5.0% of a copolymerizable ultraviolet light stabilizer to the emulsion; and (c) reacting the emulsion under conditions effective to polymerize the monomers to form discrete composite particles comprising cores of the styrene-butadiene polymer which are at least partially encased by an integral shell of the copolymer of the selected monomer and the ultraviolet light stabilizer.

The process for screen printing according to the present invention comprises: (a) forming a thickened dispersion of a pigment and the core-shell polymer composition defined above; (b) contacting a textile with a screen printing mask having a predetermined pattern therein; (c) passing the thickened dispersion through the predetermined pattern and onto the textile in the predetermined pattern; and (d) heating the fabric to fuse the binder and fix the pigment to the textile.

DETAILED DESCRIPTION OF THE INVENTION

The improved polymers of the present invention are true core-shell polymers which, when employed in screen printing of textiles as screen print binders, provide superior properties in the final textile product. Textiles printed with these compositions as binders have very good crock fastness, both wet and dry, as well as improved cyclic aging due to their good heat resistance and increased stability to ultraviolet light. Quite unexpectedly, the stability to ultraviolet light is improved beyond what would be predicted and the printed textiles are very soft when felt in the hand and drape and flow naturally. The reason for the unexpectedly good hand of the materials printed with these polymer compositions as binders is not fully understood. Likewise, the synergistic increase in the effectiveness of the ultraviolet light stability is unexpected.

The polymer composition of the present invention will preferably comprise from about 40 to about 95%, based on the dry weight of the total composition, of discrete cores of styrene-butadiene copolymer. Most preferably, the composition will contain from about 70 to 92% of the styrene-butadiene copolymer. The shells can completely or partially cover the cores.

The SBR copolymer will preferably be made up from a mixture of monomers effective to provide from about 15 to 70% by weight of the core of styrene, from 30 to 80% by weight of the core of butadiene, from 0 to 10% by weight of the core of the copolymerizable carboxylic acid, and an antioxidant in an amount effective to improve the stability of the SBR against oxidation. Preferably, the styrene will comprise from about 25 to 55% by weight of the core, the butadiene will comprise from about 40 to 70% by weight of the core, the copolymerizable carboxylic acid will comprise 1 to 5% of the weight of the core, and the antioxidant will comprise from 0.1 to 2%. The copolymerizable carboxylic acid can be any of those known in the art for this particular function and can desirably be itaconic acid, methacrylic acid, or fumaric acid. Preferably, the carboxylic acid will be a member selected from the group consisting of itaconic acid, methacrylic acid and combinations of these. The most preferred carboxylic acid will be a combination of itaconic and methacrylic acids. The antioxidant is intimately mixed with and uniformly distributed throughout the individual cores.

The process for polymerizing the styrene-butadiene copolymer is well known in the art and is exemplified herein and in said U.S. patent application Ser. No. 016,133, now abandoned. One suitable method is that described at page 325 in Bovey et al, Emulsion Polymerization, 1955, published by Interscience Publishers, Inc. Typically, it entails obtaining an emulsion of the desired monomers in the desired percentages and polymerizing onto a seed polymer. The formation of the SBR copolymer core portion of the polymer compositions of this invention does not in and of itself form a part of this invention and can be accomplished according to known techniques. It is, however, preferred that the antioxidant be included in the monomer mixture and intimately admixed therewith prior to polymerization.

A wide variety of antioxidants can be employed. Those preferred are characterized by a combination of properties which enable the realization of the most desirable results. First, the antioxidant material should not inhibit the polymerization reaction, either by its chemical constitution or by the amount thereof which is included in the monomer feed composition. Secondly, it should not itself stain or impart color into the final SBR product. Thirdly, it should be particularly effective in preventing air oxidation of the polymer, as evidenced by a significant lessening of yellowing of the rubber with age upon exposure to air and light. Finally, it will preferably increase the tensile strength of the rubber. Among the antioxidants which can be employed are thiobisphenol and phenolic sulfides such as 2,2'-thiobis-(4-methyl-6-t-butylphenol), 1,1'-thiobis-(2-naphthol), 4,4'-thiobis-(3-methyl-6-t-butylphenyl), alkylidenedithiobisphenols; phosphites and phosphates such as those disclosed in U.S. Pat. No. 3,662,033 and U.S. Pat. No. 3,801,541; monophenols such as Wingstay-S 2,4,6-styrenated phenol, Wingstay-T butylated phenol, COA-1 and -6 2,6-di-t-butyl-p-cresol (butylated hydroxytoluene "BHT"), Nevastain-A indenated phenols, Irganox-565 2-(4-hydroxy-3,5-di-t-butylphenoxy)-6-n-octylthio-1,3,5-triazine, Irganox-1076 n-octadecyl-beta(3,5-dibutyl-4-hydroxyphenyl)-propionate, Irganox-1093 2,4-bis-(octylthio)-6-(4'-hydroxy-3',5'-di-t-butylanilino)-1,3,5-triazine; and polyphenols such as Wingstay-L 2,2'-methylenebis-(b-alpha-methyl-benzyl-p-cresol), and Irganox-1010 tetrakis-(methylene-3,4-di-t-butyl-4-hydroxy-hydrocinnamate)-methane.

The shell portion of the composition of this invention will typically comprise from 5 to 60%, and preferably from 8 to 30%, of the dry weight of the total composition, and will be a copolymer of a copolymerizable ultraviolet light stabilizer with at least one monomer selected from the group consisting of alkyl acrylates and alkyl methacrylates, wherein the alkyl group contains from 1 to 18 carbon atoms. Preferably, the alkyl group with contain from 1 to 9 carbon atoms and most preferably will be a member selected from the group consisting of methyl, ethyl, propyl, butyl and combinations of these.

The shell is formed integrally with and at least partially surrounds the core. The polymerization technique itself is well known to the art and is described in the above-identified Ser. No. 115,824, the disclosure of which is hereby incorporated by reference. The copolymer forming the shell will be made of the appropriate monomers to obtain a desirable balance of properties for the particular application.

The copolymerizable ultraviolet light stabilizer containing the reactive alkyl or vinyl group, which will integrate the monomer into the backbone of the shell polymer, will be employed in an amount which is effective to improve the ultraviolet light stability of the polymer. Typically, this will amount to from about 0.01 to 5.0% based on the weight of the shell composition. Preferably, the ultraviolet light stabilizer will be employed in an amount from about 0.1 to about 2.0% based on the weight of the shell. In the most preferred situation, the molar ratio of the ultraviolet light stabilizer to the other monomers will be within the range of from about 1:150 to about 1:25.

The ultraviolet light stabilizers which can be employed according to the present invention are those which will copolymerize with alkyl acrylates and become an integral part of the shell of the core-shell polymers. In order to be effective in this regard, it is presently believed that the stabilizer must have a reactive alkyl or vinyl group which will take part in the polymerization reaction. Typical of the ultraviolet light absorbers which can be employed are 2-hydroxy-4-allyloxy benzophenone and

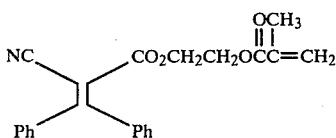

wherein Ph is phenyl. Of these, the former is preferred. The shell-forming materials are copolymerized in the presence of the cores in aqueous dispersion under conditions well known in the art for copolymerizing the monomers involved. Again, the disclosure of the above-identified copending application is referred to and is specifically incorporated by reference with regard to the polymerization of the shell material about the core. By virtue of the selection of the appropriate shell-forming monomers, the core particle size and the conditions of reaction, the core/shell number for forming the core-shell polymer of the present invention will typically be above about 10.

The discrete particles of the core-shell polymer formed according to this invention will typically be of about the same average size with discrete particles having a number average diameter within the range of from 0.1 to 5 microns and a weight average diameter within the same range. The ratio of the number average diameter to the weight average diameter is a measure of the dispersity of particle size. Typically, the ratio will be within the range of from about 1.001 to about 5.0. The preferred ratios will be within the range of from about 1.001 to about 1.5.

Once formed, the discrete composite particles of the polymer composition of the present invention can be dried and easily redispersed in water or a polar solvent such as dimethylformamide at the time of use. A typical composition employed for screen printing of textiles will comprise from about 1 to about 15 weight percent of the core-shell polymer composition of this invention, from about 50 to about 90% water, from about 1 to about 15% of a pigment, from about 0.25 to about 10% of a suitable thickener known to the art, and from about 0 to about 50% of a suitable organic solvent known to the art. If the polymer composition of the present invention had been dried prior to redispersion, it may be necessary to homogenize the dispersion by mixing for up to 30 minutes with a homogenizer to properly form the dispersion.

In applying colored patterns to textiles by the process of screen printing employing the improved polymer compositions of the present invention, it is first necessary to form a dispersion of the pigment, thickener and the polymer composition in water. This composition will typically have a solids content of from about 5 to about 15% and will have a ratio of pigment to binder in the range of from about 1:1 to about 1:5. A screen printing mask having a predetermined pattern is contacted with a textile preferably under light pressure as is known in the art. Then, the dispersion of pigment and polymer composition is applied to the screen printing mask by pouring the paste onto the screen. The dispersion passes through the screen mask and imparts the predetermined pattern to the textile. To fix the pigment to the textile, the fabric is typically heated to fuse the binder and simultaneously fix the pigment to the textile. This is normally done by heating to a temperature of from about 100° to about 200° C. in an air oven for about 1 to about 20 minutes, preferably about 5 minutes. Textiles patterned in this manner have good crock fastness both wet and dry, good cyclic aging, and good hand.

The following examples are presented for the purpose of further illustrating and explaining the present invention and are not to be taken as limiting in any regard. Unless otherwise indicated, all parts and percentages are by weight.

EXAMPLE I

This example describes the preparation of a core-shell polymer composition according to the invention which has improved stability to oxidation accelerated by heating and to ultraviolet light. The composition is particularly suitable for screen mask printing designs onto textile fabrics. Its stability is compared, when so used, the polymer compositions wherein antioxidant and ultraviolet light absorber are not employed according to the invention.

The core is prepared of a styrene-butadiene-itaconic acid-methacrylic acid random copolymer and the shell is prepared by polymerizing over the core a monomer mixture comprising methyl acrylate, butyl methacrylate, methacrylic acid, and 2-hydroxy-4-allyloxy benzophenone as an ultraviolet light absorber. The core contains 2,4,6-styrenated phenol as an antioxidant polymerized with the core-forming monomers.

To prepare the core emulsion, the following materials are sequentially charged into a 1 gallon high pressure kettle equipped with a mechanical stirrer, thermometer, pressure gauge and three charging inlets:

| Charge No. | Ingredients | % in H$_2$O | Weight (g) |
|---|---|---|---|
| A-1 | Water (distilled) | | 763.3 |
| | Hampene-100 (EDTA) (chelating agent) | 38 | 1.8 |
| | Itaconic acid | — | 15.0 |
| | Monawet MB-45 Diisobutyl sodium sulfo succinate (surfactant) | 45 | 8.9 |
| | SBR Seed latex | 42 | 72.5 |
| A-2 | Water (distilled) | | 41.5 |
| | Ammonium persulfate | — | 2.0 |
| B-1 | Styrene | — | 323.7 |
| | Butadiene | — | 512.5 |
| | Methacrylic acid | — | 10.0 |

-continued

| Charge No. | Ingredients | % in H₂O | Weight (g) |
|---|---|---|---|
| | Tertiary dodecyl mercaptan | — | 4.0 |
| | 2,4,6-styrenated phenol (antioxidant) | — | 5.8 |
| B-2 | Water (distilled) | | 175.9 |
| | Sodium hydroxide | 20 | 15.0 |
| | Ammonium persulfate | — | 5.0 |
| | Monawet MB-45 Diisobutyl sodium sulfo succinate (surfactant) | 45 | 8.0 |

These materials are added and processed in the following stagewise procedure:
(1) Charge A-1 is added to the kettle.
(2) The kettle is purged with nitrogen by first evacuating the kettle to 5" vacuum, then breaking the vacuum with nitrogen, and building pressure up to 25 psi. This sequence is repeated twice.
(3) Agitation is started at 300 RPM.
(4) Temperature of the contents of the kettle is raised to 180° F. in 20 minutes.
(5) When temperature reaches 180° F., the reaction is started by adding A-2 in one shot, and then
(6) Starting the Charges B-1 and B-2 from two separate inlets.
(7) Addition of B-1 and B-2 is complete in four hours, while maintaining temperature at 180° F.

At the end of 4.0 hours, the preparation of the core portion of the composition is complete. The resulting core material contains 34.8 parts styrene and 55.0 parts butadiene.

To form the shell on the core, the following further materials are added stagewise:

| Charge No. | Ingredients | % in H₂O | Weight (g) |
|---|---|---|---|
| B-3 | Water (distilled) | | 333.8 |
| | Ammonium persulfate | — | 2.2 |
| B-4 | Butyl methacrylate | — | 57.0 |
| | Methyl acrylate | — | 45.0 |
| | Methacrylic acid | — | 3.3 |
| | 2-hydroxy-4-allyloxy benzophenone(copolymerizable UV light absorber) | — | 4.9 |

These materials are added and reacted as follows:
(8) Charge B-3 is added in 60 seconds.
(9) Charge B-4 is added over 45 minutes.
(10) Temperature is raised to 190° F. in 10 minutes, and then it is maintained for 1 hour.
(11) The contents of the kettle are cooled to room temperature, and the latex is discharged through a 40 mesh screen.

The resulting product is a true core-shell polymer which, in latex form, has the following properties:
a. Solids, %: 42.3±2
b. Coagulum, %: <0.5%
c. Residual monomers: 0.4%±0.1 by gas chromatography
d. Surface tension, dyne/cm: 53.5±3
e. pH: 4.5±0.5
f. Brookfield viscosity LV (1-60): 170±70
g. Turbidity: 3.2±0.2
h. Mechanical stability: good This material is formed into a film by pouring a latex into a leveled mold, evaporating water at ambient conditions then curing the cast film at 300° F. for 5 minutes.

The film has the following properties:
a. Tensile strength, psi: 529±50
b. Elongation, %: 2050±200
c. Clarity: good
d. Water spot test: none The latex is identified as number 1 and is used as a binder for a print paste also comprising a thickener and a colorant. The print paste is transferred onto polyester/cotton fabric by means of a flat bed screen and squeegee. Further print pastes are prepared with latexes identified as 2 through 9 in Table I. The latexes were prepared in the same manner as described above except for the noted variations. These were also used to print fabrics. The printed fabrics were then tested for thermal stability by exposing at 250° F. for 24 hours and ultraviolet light resistance by AATCC Test Method #16E. The results are shown in Table I.

TABLE I

| Latex No. | Antioxidant (Parts) | | UV Stabilizer (Parts) | | Thermal Stability | UV Resist. |
|---|---|---|---|---|---|---|
| | Core | Shell | Core | Shell | | |
| 1 | 0.5 | — | — | 0.5 | Good | Good |
| 2 | — | 0.5 | 0.5 | — | Poor | Poor |
| 3 | — | — | — | 0.5 | Poor | Fair |
| 4 | 0.5 | — | — | — | Good | Poor |
| 5 | — | — | — | — | Poor | Poor |
| 6 | 0.5 | — | 0.5 | — | Good | Poor |
| 7 | — | 0.5 | — | 0.5 | Poor | Fair |
| 8 | — | — | 0.5 | — | Poor | Poor |
| 9 | — | 0.5 | — | — | Poor | Poor |

The data show that ultraviolet light resistance is improved when the UV stabilizer is employed in the shell, but is rated good only when antioxidant is employed in the core.

EXAMPLE II

This example illustrates the preparation and testing of another core-shell polymer according to the present invention. The core portion is prepared in a manner and from a formulation similar to that shown as number 1 in Example I. A commercial, all acrylic latex (Rhoplex E-32) available from Rohm & Haas was employed as a control. Both the test latex and the control latex were used to prepare print pastes which were then applied as in Example I. The property of crockfastness both wet and dry was tested by AATCC Test Method #8, cyclic aging by AATCC Test Method #16E and hand by subjective evaluation. The results, where 1 is poor and 5 is best, are shown in Table II:

TABLE II

| | Crockfastness | | Cyclic Aging | Hand |
|---|---|---|---|---|
| | Dry | Wet | | |
| Control | 4+ | 3 | 3 | 2 |
| Test, Example II | 4++ | 3 | 4 | 3 |

The above description is for the purpose of teaching those skilled in the art how to practice the invention and is not meant to recite all those possible modifications and variations of it which will become apparent from reading this description. It is intended, however, that all those obvious modifications and variations be included within the scope of the present invention which is defined by the following claims.

What is claimed is:
1. A core-shell polymer composition comprising:

(a) discrete cores of styrene-butadiene copolymer having antioxidant intimately mixed therein in amounts effective to improve the stability of the copolymer to oxidation; and (b) shells of a copolymer formed from:
  (1) at least one monomer selected from the group consisting of alkyl methacrylates and alkyl acrylates; and
  (2) an ultraviolet light stabilizer containing a copolymerizable vinyl group or a copolymerizable group which is a reactive precursor of an alkyl group;

said shells completely surrounding said cores.

2. A core-shell polymer according to claim 1 wherein:
  (a) the core-shell polymer composition comprises between about 5 and about 60 wt% of said shells;
  (b) said discrete cores of styrene-butadiene copolymer comprise between about 15 and about 70 wt% styrene, between about 30 and about 80 wt% butadiene, between about 0 and about 10 wt% of a copolymerizable carboxylic acid and between about 0.1 and about 2 wt% antioxidant; and
  (c) the shells of the core-shell polymer composition comprise between about 0.01 and about 5 wt% ultraviolet light stabilizer.

3. A core-shell polymer composition according to claim 2 wherein:
  (a) the core-shell polymer composition comprises between about 8 and about 30 wt% of said shells,
  (b) said discrete cores of styrene-butadiene copolymer comprise between about 25 and about 55 wt% styrene, between about 40 and about 70 wt% butadiene, and between about 1 and about 5 wt% of a copolymerized carboxylic acid; and
  (c) the shells of the core-shell polymer composition comprise between about 0.1 and about 2 wt% ultraviolet light stabilizer.

4. A core-shell polymer according to claim 3 wherein:

(a) the alkyl acrylate or methacrylate has an alkyl group comprising from 1 to 18 carbon atoms; and
(b) the ultraviolet light stabilizer comprises a member selected from the group consisting of 2-hydroxy-4-allyloxy benzophenone or

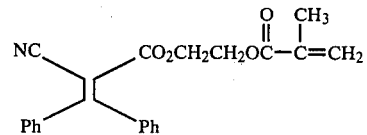

wherein Ph is Phenyl, and combinations of these.

5. A core-shell polymer according to claim 4 wherein the ultraviolwet light stabilizer is 2-hydroxy-4-allyloxy benzophenone and is present at a molar ratio with respect to the other monomers in the shell within the range of from about 1:150 to about 1:25.

6. Process for making a core-shell polymer which comprises:
  (a) providing an emulsion of discrete particles of styrene-butadiene copolymer in an aqueous vehicle, said copolymer containing intimately mixed therein amounts of antioxidant effective to improve the stability of the copolymer to oxidation;
  (b) adding to said emulsion a monomer mixture comprising:
    (1) at least one monomer selected from the group consisting of alkyl methacrylates and alkyl acrylates; and
    (2) between about 0.01 and about 5.0 wt% based on said monomer mixture of an ultraviolet light stabilizer containing a copolymerizable vinyl group or a copolymerizable group which is a reactive precursor of an alkyl group; and
  (c) copolymerizing said monomer mixture about said discrete particles of styrene-butadiene copolymer so as to completely surround said particles with shells of copolymer of said monomer and said ultraviolet light stabilizer.

* * * * *